(12) United States Patent
Gila et al.

(10) Patent No.: US 8,717,647 B2
(45) Date of Patent: May 6, 2014

(54) IMAGING METHODS, IMAGING DEVICE CALIBRATION METHODS, IMAGING DEVICES, AND HARD IMAGING DEVICE SENSOR ASSEMBLIES

(75) Inventors: Omer Gila, Cupertino, CA (US); William David Holland, Mountain View, CA (US); Eyal Shelef, Tel Aviv (IL); Shlomo Harush, Nez Ziyonaz (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1577 days.

(21) Appl. No.: 11/250,784

(22) Filed: Oct. 13, 2005

(65) Prior Publication Data

US 2007/0086071 A1    Apr. 19, 2007

(51) Int. Cl.
*H04N 1/46* (2006.01)

(52) U.S. Cl.
USPC .......................................... 358/504; 358/474

(58) Field of Classification Search
USPC .................................................. 358/400–498
See application file for complete search history.

(56) References Cited

U.S. PATENT DOCUMENTS

| | | | |
|---|---|---|---|
| 3,846,027 A * | 11/1974 | Hyman et al. ................. | 356/418 |
| 4,690,564 A | 9/1987 | Morgenstern et al. | |
| 4,750,838 A | 6/1988 | De Wolf et al. | |
| 4,952,949 A * | 8/1990 | Uebbing ....................... | 347/237 |
| 4,963,028 A | 10/1990 | Braun et al. | |
| 5,053,822 A | 10/1991 | Butler | |
| 5,137,364 A | 8/1992 | McCarthy | |
| 5,137,750 A | 8/1992 | Amin et al. | |
| 5,204,538 A | 4/1993 | Genovese | |
| 5,357,448 A | 10/1994 | Stanford | |
| 5,450,165 A * | 9/1995 | Henderson ..................... | 399/49 |
| 5,537,516 A * | 7/1996 | Sherman et al. ................ | 358/1.9 |
| 5,612,727 A * | 3/1997 | Morimoto et al. ............ | 347/198 |
| 5,666,436 A | 9/1997 | Eames | |
| 5,854,680 A | 12/1998 | Rakitsch | |
| 5,864,353 A | 1/1999 | Gila et al. | |
| 5,937,750 A * | 8/1999 | Takeda ......................... | 101/116 |
| 6,028,674 A | 2/2000 | Tognazzini | |
| 6,229,972 B1 | 5/2001 | Rushing | |
| 6,384,918 B1 | 5/2002 | Hubble et al. | |
| 6,462,821 B1 | 10/2002 | Borton et al. | |
| 6,519,038 B1 | 2/2003 | Kritchman | |

(Continued)

FOREIGN PATENT DOCUMENTS

| | | |
|---|---|---|
| DE | 10314071 | 9/2004 |
| DE | 10361936 | 7/2005 |

(Continued)

OTHER PUBLICATIONS

"X-Rite: 504 Color Refelction Spectrodensiometer"; http://www.xrite.com/documents.mktg/L7-169.pdf.

*Primary Examiner* — Benny Q Tieu
*Assistant Examiner* — Michael Y Tzeng (57) ABSTRACT

Imaging methods, imaging device calibration methods, imaging devices, and hard imaging device sensor assemblies are described. According to one aspect, an imaging method includes forming a hard color image upon media using image data, the hard color image corresponding to the color image, and after the forming, sensing an optical characteristic of the hard color images at a plurality of different spatial locations of individual ones of the hard color images, and providing information regarding the optical characteristic at the different spatial locations of the hard color image after the sensing.

31 Claims, 8 Drawing Sheets

(56) References Cited

U.S. PATENT DOCUMENTS

| | | |
|---|---|---|
| 6,611,666 B2 * | 8/2003 | Regelsberger et al. ......... 399/74 |
| 6,650,416 B2 | 11/2003 | Tandon et al. |
| 6,665,424 B1 | 12/2003 | Stringa |
| 6,952,263 B2 | 10/2005 | Weiss et al. |
| 7,069,164 B2 * | 6/2006 | Viturro et al. ................... 702/85 |
| 7,260,244 B2 | 8/2007 | Shikami et al. |
| 7,388,690 B2 * | 6/2008 | Thakur ......................... 358/406 |
| 7,447,353 B2 | 11/2008 | Diederichs et al. |
| 2003/0007804 A1 | 1/2003 | Regelsberger et al. |
| 2003/0072002 A1 | 4/2003 | Uejima |
| 2003/0132982 A1 * | 7/2003 | Tandon et al. ................... 347/19 |
| 2004/0057629 A1 | 3/2004 | Shikami et al. |
| 2004/0064213 A1 | 4/2004 | Vansteenkiste et al. |
| 2005/0052654 A1 | 3/2005 | Gila et al. |
| 2006/0251320 A1 | 11/2006 | Diederichs et al. |

FOREIGN PATENT DOCUMENTS

| | | |
|---|---|---|
| EP | 1400922 A1 | 3/2004 |
| GB | 2071573 | 2/1981 |
| GB | 2071573 | 9/1981 |
| WO | WO2005094054 A1 | 10/2005 |

* cited by examiner

IMAGING METHODS, IMAGING DEVICE CALIBRATION METHODS, IMAGING DEVICES, AND HARD IMAGING DEVICE SENSOR ASSEMBLIES

FIELD OF THE DISCLOSURE

Aspects of the disclosure relate to imaging methods, imaging device calibration methods, imaging devices, and hard imaging device sensor assemblies.

BACKGROUND

Imaging devices capable of printing color images upon paper and other media are becoming increasingly popular and used in many applications for color reproduction. For example, laser printers, ink jet printers, and digital printing presses are but a few examples of imaging devices in wide use today.

As the use of color imaging devices continues to increase, the demand for quality color image reproduction has also increased for at least some applications. For example, it is desirable in some color imaging applications to consistently generate color images of acceptable color consistency which may be considered to be one of the most important print quality characteristics. The demands may require spatial color consistency wherein colors are reproduced substantially the same over a given sheet of media. In addition, for applications where relatively high volumes of an image are generated, constant color consistency over time for many sheets of media may be desirable or of paramount importance. It may also be desirable or important to generate color images which match or are substantially the same as the images provided by a monitor, scanner, camera, other presses or otherwise provided for reproduction.

In one imaging example, a plurality of versions of the same image may be replicated on a single sheet of paper which is also reproduced in relatively high volumes (e.g., printing business cards). It is desirable to provide color consistency for the images on the same sheet of paper as well as with respect to images on other sheets of paper. Color consistency depends on image thickness which is dependent upon numerous physical parameters, such as temperature, consumables (photoconductor, inks, paper, etc.) humidity, pressures, etc.

At least some aspects of the disclosure provide apparatus and methods which provide improvements with respect to color imaging, for example, including improved color consistency.

SUMMARY

According to some aspects of the disclosure, exemplary imaging methods, imaging device calibration methods, imaging devices, and hard imaging device sensor assemblies are described.

According to one embodiment, an imaging method comprises forming a hard color image upon media using image data, the hard color image corresponding to the color image, and after the forming, sensing an optical characteristic of the hard color images at a plurality of different spatial locations of individual ones of the hard color images, and providing information regarding the optical characteristic at the different spatial locations of the hard color image after the sensing.

According to another embodiment, an imaging device comprises an image engine configured to provide a marking agent upon media in a media path of the imaging device to form a plurality of hard color images upon the media, a plurality of densitometers positioned adjacent to the media path and configured to provide a plurality of signals regarding an optical characteristic of at least one of the hard color images at a plurality of different spatial locations of the at least one hard color image, and processing circuitry coupled with the densitometers and configured to receive the signals and to provide information regarding the optical characteristic at respective ones of the different spatial locations of the at least one hard color image using the signals.

DETAILED DESCRIPTION

At least some aspects of the disclosure relate to methods and apparatus for monitoring and implementing imaging operations of hard color images upon media, such as paper. In one embodiment, an optical characteristic related to image thickness of one or more marking agent may be monitored of a hard color image. An exemplary optical characteristic is optical density (OD). A densitometer is one possible configuration to implement sensing of optical density of the hard color image. Additional details regarding sensing of hard color images using a densitometer are described in a co-pending commonly assigned U.S. patent application having Ser. No. 10/658,939, filed Sep. 9, 2003, entitled "Densitometers And Methods For Measuring Optical Density", listing Omer Gila and William David Holland as inventors, having U.S. Patent Publication No. 2005/0052654, published on Mar. 10, 2005, and the disclosure of which is incorporated herein by reference. As described below, at least some of the embodiments disclose a sensor assembly including a plurality of densitometers configured to monitor a plurality of different spatial regions or locations of a hard color image formed upon media. Imaging operations may be modified using data acquired from the monitoring during imaging operations, for example, to improve color consistency and/or provide calibration of an imaging device. Other aspects of the disclosure are described herein.

Figure 1:
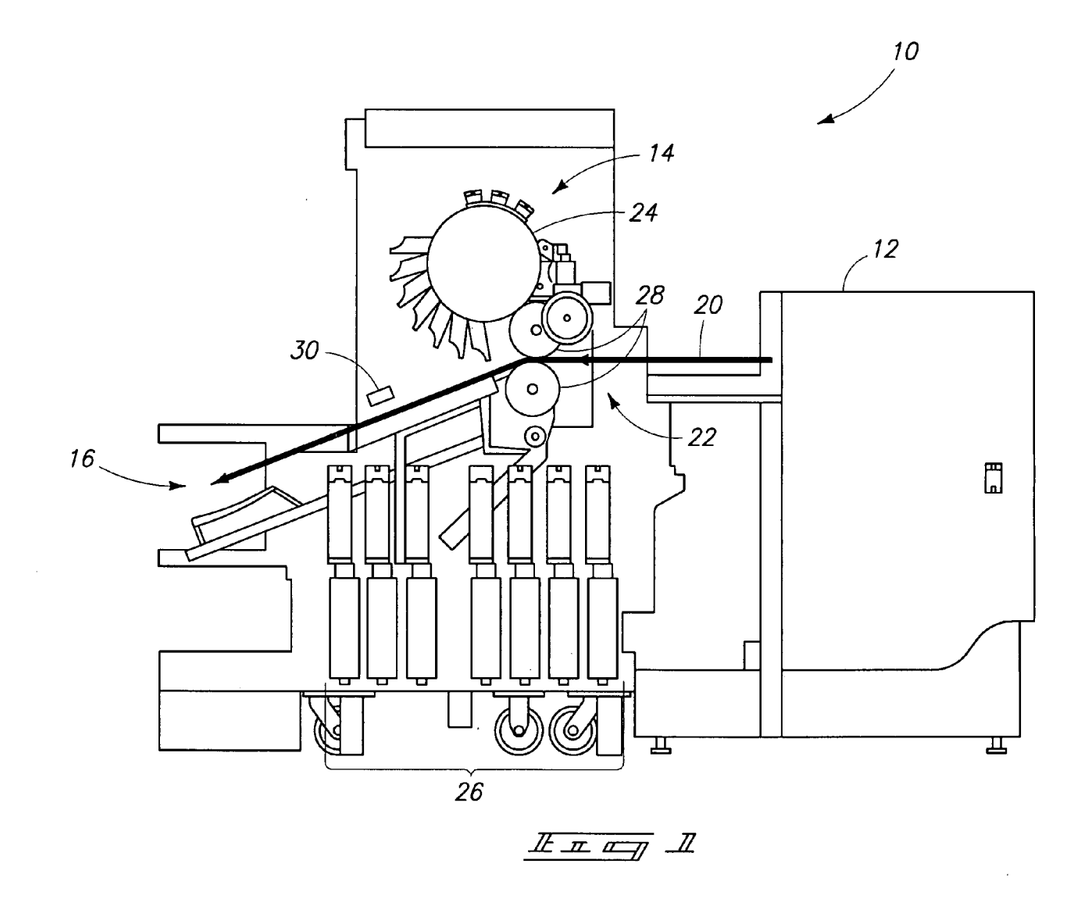
FIG. 1 is an illustrative representation of an imaging device according to one embodiment.

Referring to FIG. 1, an illustrative representation of an imaging device is depicted according to one embodiment with respect to reference sign 10. In one embodiment, the imaging device 10 may be configured as a digital imaging device configured to access or generate digital image data to form hard color images upon media, such as paper, labels, transparencies, etc. For example, the imaging device 10 may be configured as a digital press, such as an HP Indigo 5000 digital printing press available from Hewlett-Packard Company, in one exemplary arrangement.

Imaging device 10 includes a media feed unit 12, an image engine 14 and an output handling unit 16 in the depicted exemplary configuration. Media may be transferred along a paper path 20 from media feed unit 12 to image engine 14 for the formation of hard images and subsequently outputted to output handling unit 16.

In the depicted embodiment, image engine 14 is configured to implement electrophotographic imaging operations to form latent images responsive to image data and develop the latent images using marking agents of a plurality of different colors. In one implementation, image engine 14 uses a photoconductive drum 24 to form and develop latent images using the marking agents. The developed color images may be transferred via imaging drums 28 to media (not shown in FIG. 1) within the media path 20. The imaging drum 28 adjacent to the photoconductor 24 may be referred to as a blanket drum while the imaging drum adjacent to the paper path 20 may be referred to as an impression drum.

The described exemplary image engine may receive the marking agents from a plurality of reservoirs 26 configured to store the marking agents of the different colors. The marking agents are liquid inks in the described embodiment although other types of marking agents may be used in other embodiments. Other configurations of image engine 14 are possible.

A sensor assembly 30 is illustrated downstream from image engine 14. Sensor assembly 30 is positioned downstream of image engine 14 along media path 20 and is configured to monitor hard color images formed upon media by image engine 14 or otherwise provided within media path 20. In other embodiments, sensor assembly 30 may be positioned at other locations (e.g., positioned and configured to monitor images upon photoconductor 24). Exemplary operations and configurations of sensor assembly 30 are discussed further below.

Figure 2:
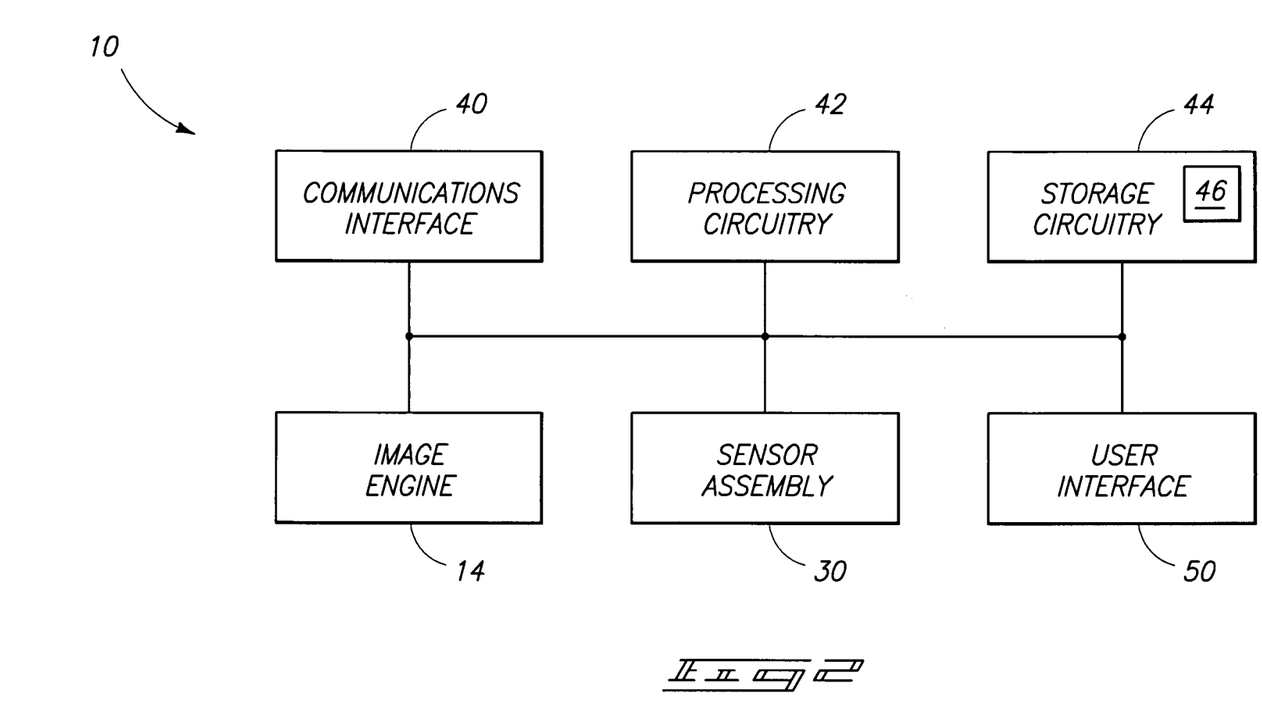
FIG. 2 is a functional block diagram of the imaging device according to one embodiment.

Referring to FIG. 2, additional components of an exemplary imaging device 10 are depicted according to one embodiment. Imaging device 10 may include a communications interface 40, processing circuitry 42, storage circuitry 44, image engine 14, sensor assembly 30, and a user interface 50 electrically coupled with one another, for example, via a bus. Other configurations are possible including more, less and/or alternative components.

Communications interface 40 is arranged to implement communications of imaging device 10 with respect to external devices (not shown). For example, communications interface 40 may be arranged to communicate information bi-directionally with respect to external devices. Communications interface 40 may be implemented as a network interface card (NIC), serial or parallel connection, USB port, Firewire interface, flash memory interface, floppy disk drive, or any other suitable arrangement for communicating with respect to imaging device 10. According to some examples, communications interface 40 may be coupled with a host or a network. In another example, imaging device 10 may operate as a stand-alone imaging device without a host or network.

In one embodiment, processing circuitry 42 is arranged to process data (e.g., access and process digital image data corresponding to a color image to be hard imaged upon media), control data access and storage, issue commands, monitor imaging operations and/or control imaging operations (e.g., control imaging operations and/or implement calibration operations responsive to monitoring as described below in exemplary embodiments). Processing circuitry 42 may comprise circuitry configured to implement desired programming provided by appropriate media in at least one embodiment. For example, the processing circuitry 42 may be implemented as one or more of a processor and/or other structure configured to execute executable instructions including, for example, software and/or firmware instructions, and/or hardware circuitry. Exemplary embodiments of processing circuitry 42 include hardware logic, PGA, FPGA, ASIC, state machines, and/or other structures alone or in combination with a processor. These examples of processing circuitry 42 are for illustration and other configurations are possible.

The storage circuitry 44 is configured to store programming such as executable code or instructions (e.g., software and/or firmware), electronic data (e.g., image date), databases, look up tables, or other digital information and may include processor-usable media. Processor-usable media includes any computer program product or article of manufacture 46 which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 44 described above and/or communicated via a network or using other transmission media and configured to control appropriate processing circuitry 42. For example, programming may be provided via appropriate media including for example articles of manufacture 46, embodied within a data signal (e.g., modulated carrier wave, data packets, digital representations, etc.) communicated via an appropriate transmission medium, such as a communications network (e.g., the Internet and/or a private network), wired electrical connection, optical connection and/or electromagnetic energy, for example, via communications interface 40, or provided using other appropriate communication structure or medium. Exemplary programming including processor-usable code may be communicated as a data signal embodied in a carrier wave in but one example.

Image engine 14 is configured to implement electrophotographic imaging operations to form and develop latent images in one possible embodiment as described above. Other configurations for forming images upon media are possible.

As mentioned above, sensor assembly 30 is configured to monitor hard color images provided upon media. Sensor assembly 30 may sense a hard color image and provide electrical signals indicative of an optical characteristic at one or more spatial locations of a hard color image. The optical characteristic may be related (e.g., proportional) to image thickness at the respective spatial location(s) of the hard color image and, for example, used in monitoring imaging and/or improving color consistency. Processing circuitry 42 may use the signals to calculate the optical characteristic comprising optical density at the respective location(s) of the hard color image in one embodiment. Processing circuitry 42 may implement calibration operations, adjust imaging operations and/or perform other desired actions using the output from sensor assembly 30 in possible embodiments as described further below.

User interface 50 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface 50 may include a display (e.g., cathode ray tube, LCD, etc.) configured to depict visual information and an audio system as well as a keyboard, mouse and/or other input device. Any other suitable apparatus for interacting with a user may also be utilized.

Figure 3:
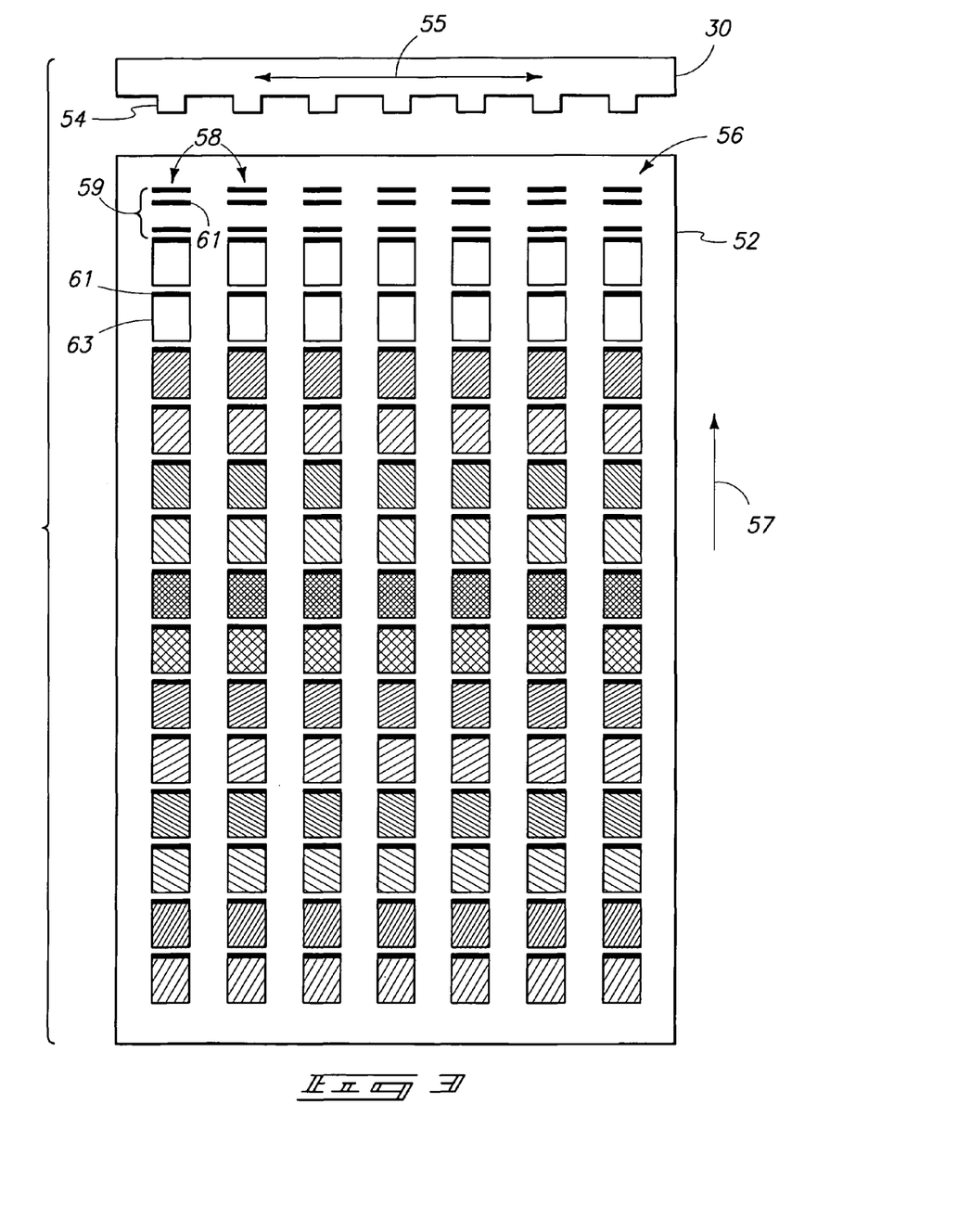
FIG. 3 is an illustrative representation of a sensor assembly and media according to one embodiment.

Referring to FIG. 3, operations of an exemplary sensor assembly 30 are shown with respect to an exemplary piece of media 52 having a hard color image 56 formed thereon. Hard color image 56 may be formed by image engine 14 or provided by another source. The depicted hard color image 56 includes a plurality of predefined patterns 58 discussed in further detail below. Predefined may be construed to mean the contents of the patterns 58 are stored in storage circuitry 44 prior to shipment of imaging device 10 from a manufacturing facility or otherwise provided prior to on-the-fly imaging of at least some image jobs including jobs defined by a user.

In the depicted embodiment, sensor assembly 30 includes a plurality of sensors 54. Sensors 54 are optically coupled with different spatial locations or regions of hard color image 56 and media 52 in the depicted example. More specifically, the sensors 54 are arranged in a spaced relationship along a scan direction 55 of image engine 14 in the embodiment of FIG. 3 (e.g., scan direction 55 may correspond to a scanning direction of a laser of image engine 14 in an exemplary electrophotographic imaging arrangement). In the example of FIG. 3, the different spatial regions or locations of the hard color image 56 correspond to the locations of the predefined patterns 58, respectively.

Sensors 54 are configured to sense an optical characteristic or parameter of the hard color image 56 at the corresponding respective spatial locations. In one embodiment, sensors 54 sense an optical characteristic which is proportional to image thickness of the hard color image 56 at the respective spatial locations. In a more specific embodiment, sensors 54 may be configured as densitometers configured to provide information regarding the optical characteristic including optical density. Sensors 54 may quantify colors in a 2D array corresponding to the scan and process directions in one embodiment.

Figure 4:
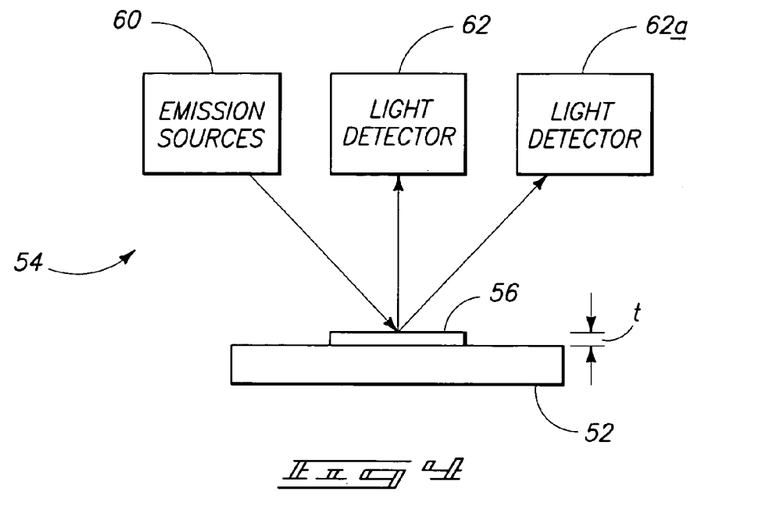
FIG. 4 is an illustrative representation showing exemplary sensing of media according to one embodiment.

Referring to FIG. 4, an exemplary configuration of one of the sensors 54 configured as a densitometer to provide information regarding optical density indicative of image thickness (t) is illustrated. Other configurations of sensors 54 are possible.

As shown in FIG. 4, the sensor 54 may include a plurality of emission sources 60 and a light detector 62. Emission sources 60 may individually include one or more light emission devices, such as light emitting diodes (LEDs), configured to emit light beams of different wavelengths of light. The wavelength of light emitted by emission sources 60 may be selected corresponding to the color of the spatial location of the hard color image 56 being sensed at a moment in time.

In one embodiment, sensors 54 (or other structure) may monitor the colors of the respective locations of the hard color image 56 to determine the colors to be sensed. For example, sensors 54 may monitor and quantify the printed color using standard units like Optical Density T status. In another embodiment, processing circuitry 42 may obtain information regarding the colors of the respective locations from the image data for the hard color image 56 formed by image engine 14. In yet another example, the processing circuitry 42 may access stored information regarding the specific colors of the locations if the hard color image 56 being monitored includes a predefined pattern 58.

As mentioned above, responsive to information of the color of the location of the hard color image 56 being monitored, processing circuitry 42 or other appropriate control circuitry may selectively control an appropriate one of the light emission sources 60 to emit a desired complementary wavelength of light. In one embodiment, light emission sources 60 emit light having a wavelength complementary to a color of the hard color image 56 being sensed. For example, if a given portion of a hard color image 56 being sensed is cyan, yellow, or magenta, then light emission sources 60 configured to emit respective ones of red, green or blue light may be activated to emit light to implement monitoring operations. In one arrangement, emission sources 60 of an individual sensor 54 are configured to emit red, green, or blue light to sense the optical characteristic at the location of the hard color image 56. In addition, emission sources 60 may be configured to emit light of a control wavelength (e.g., orange) to permit additional monitoring operations independent of the color of hard color image 56 being monitored as discussed below. Emission sources 60 may be configured to selectively emit light of more, less and/or alternative wavelengths in other embodiments.

Light detector 62 is configured to monitor light emitted from emission sources 60 and reflected by the hard color image 56 in one embodiment. For example, light detector 62 may be implemented as a light-to-voltage (LTV) detector, such as photodiode, or other sensor configuration arranged to receive photons of light reflected from hard color image 56 and to output an electrical signal indicative of the photons received by the light detector 62 (e.g., provide an electrical signal corresponding to the intensity of the received light). The electrical signal may be indicative of an optical characteristic (e.g., optical density) of a location of the hard color image 56 being sensed by the respective sensor 54. As shown in FIG. 4, an additional light detector 62a offset with respect to the location of hard color image 56 being monitored may be used to provide a signal indicative of gloss.

Processing circuitry 42 may process the output of the sensors 54 to determine or provide information regarding the optical characteristic of the respective locations or regions of hard color image 56 in one embodiment. In some embodiments, a plurality of outputs of the same sensor 54 may be averaged or statistically manipulated to determine the optical characteristic. In one embodiment, the optical characteristic including optical density may be calculated according to:

$$OD = a \cdot \log(V) + b \qquad \text{Eqn. 1}$$

Where a represents slope, b represents an offset, and V is the output of the sensor 54. In one embodiment, a and b may be empirically derived in an exemplary method described below.

Some embodiments of the disclosure enable provision of standardized optical density information of hard color images. More specifically, in some embodiments, light received by sensors 54 may be converted to a standardized signal indicative of standardized optical density. Converting the received light to a standardized signal generally refers to compensating for the spectrum of illuminating radiation to the area measured. For example, in one embodiment, an area is illuminated with electromagnetic radiation having a first spectrum and the standardized signal generated represents a signal that would have been received during illumination of the area with electromagnetic radiation having a standard spectrum. This is advantageous, for example, when a standard measurement is desirable, such as an ANSI T-status, or other ANSI status measurement, such as, but not limited to, ANSI A status. Standards, such as the ANSI T-status, generally specify the spectrum of electromagnetic radiation used to illuminate an area and interpret the resultant signals. In some embodiments, illumination sources are used that do not emit the spectrum of electromagnetic radiation specified by the standard. In accordance with some embodiments, ANSI T-status compliant measurements are obtained by converting the received radiation to a standardized signal indicative of standardized optical density. Accordingly, in one embodiment, the standardized signal is an ANSI T-status signal. The signal is converted to a standardized signal indicative of the standardized optical density of the area generally representing a signal that would have been generated by illumination with a defined T-status spectrum. In other embodiments, a different spectrum is used.

Some embodiments compensate for the affects of heating of the selected emission source during illumination of the area of the hard color image. In some embodiments, the signal indicative of optical density generated is affected by heating of the emission source. In general, as the emission source is heated, the intensity falls for the same drive current. In accordance with exemplary embodiments, a corrected signal may be calculated from the output of light detector 62. The corrected signal may be calculated using a non-linear formula relating the signal to a control parameter of the emission source. For example, in one embodiment, the light emission device is a light-emitting diode and the light detector 62 receiving radiation from the illuminated area is a light-to-voltage sensor. The voltage across the light-emitting diode is measured and the light-to-voltage (LTV) sensor value is modified as follows:

$$LTV_{corrected} = \frac{LTV}{1 - C \frac{V_{0\_LED} - V_{LED}}{V_{0\_LED}}} \quad \text{Eqn. 2}$$

Where LTV is the measured light-to-voltage sensor voltage, $LTV_{corrected}$ is the corrected sensor voltage, C is an empirical factor chosen depending on the LED color, current, and/or batch, $V_{0\_LED}$ is a baseline voltage and $V_{LED}$ is the operational voltage, or present voltage reading. This generally provides a non-linear relationship between the LED voltage and the light-to-voltage sensor voltage. Additional details including heat compensation with respect to operations of sensors 54 are discussed below and in the U.S. patent application incorporated by reference above.

Referring again to FIG. 3, additional details of the predefined patterns 58 are discussed. The exemplary predefined patterns 58 illustrated in FIG. 3 are configured for use in calibrating a plurality of imaging operations of imaging device 10. Other patterns may be used in other embodiments.

More specifically, the illustrated predefined patterns 58 include a synchronization portion 59 which may be used to synchronize the operations of sensor assembly 30 with respect to movement of the predefined patterns 58 along paper path 20 as well as for implementing at least one of the calibration operations of the imaging device 10 discussed below. The illustrated exemplary synchronization portion 59 includes a plurality of bars 61 (e.g., black bars having a dimension of 2 mm in the direction perpendicular to the scan direction 55 also referred to as the process direction 57 corresponding to the direction of movement of media 52 along paper path 20 during imaging operations). The detection of bars 61 passing adjacent one or more sensors 54 may be used for synchronization. One or more of the sensors 54 may be used for synchronization in exemplary embodiments. Sensors 54 may emit orange light during synchronization in one embodiment. In alternative or additional embodiments to pattern recognition, an encoder may be used to provide position information with respect to predefined patterns 58.

Downstream from the synchronization portion 59 in process direction 57, the predefined patterns 58 include a plurality of different color patches 63 which have a length of ~15 mm in the process direction 57 in one embodiment. Each of the predefined patterns 58 may include color patches 63 of all of the colors of marking agents of the imaging device 10 in one embodiment. In addition, each of the color patches 63 may include a bar 61 at the leading edge for synchronization with respect to the start of the respective color patch 63 and/or for implementing other monitoring operations, such as monitoring velocity and acceleration of media 52.

The predefined patterns 58 are the same in the illustrated embodiment. The predefined patterns 58 may be configured differently in other embodiments. For example, the patterns 58 may include different arrangements of color patches 63 in other illustrative embodiments. It is understood that the monitoring aspects of the hard color image 56 including predefined patterns 58 is described to illustrate some aspects of the disclosure. In other embodiments, other hard color images 56 may be monitored by sensor assembly 30. For example, hard color images 56 corresponding to user defined images (e.g., photographs, brochures, labels, postcards, calendars, business cards, etc.) may be monitored by sensor assembly 30 during imaging operations in other embodiments.

Predefined patterns 58 may be generated by imaging device 10 at different moments in time whenever calibration is desired. Alternatively, predefined patterns 58 may be generated by another source and inputted into paper path 20 in other different operational embodiments. Predefined patterns 58 generated by other sources may be generated to include patches which enables monitoring using an ANSI-T standardized reading in one embodiment. For example, predefined patterns 58 (e.g., including standardized patches) may be generated for initial calibration of imaging device 10 following fabrication of the imaging device 10, installation of the imaging device 10 at a user's premises, following a predetermined passage of time or number of sheets of media imaged, and/or responsive to other criteria.

Following provision of media 52 comprising the predefined patterns 58, imaging device 10 may enter a calibration mode of operation wherein the processing circuitry 42 monitors the output of sensor assembly 30 for detection of the synchronization portion 59. Emission sources 60 (FIG. 4) of sensors 54 may emit control light (e.g., orange in the exemplary configuration mentioned above) for detection of the presence of bars 61 of the synchronization portion 59 in one embodiment.

The bars 61 are offset in the illustrated exemplary synchronization portion 59 and may be used for calculation of movement information with respect to movement of the predefined patterns 58 along the paper path 20. For example, the timing of the sensing of the bars 61 in synchronization portion 59 and associated with color patches 63 may be used to calculated speed and/or acceleration of media 52 (e.g., media 52 having a velocity of 1 m/s at the start of the detection of the predefined pattern 58 and a finishing velocity of 2.5 m/s at the end of the detection). Patches 63 may be detected with an accuracy of 100 microns with a sampling frequency of 10 kHz and speed may be recalculated for each of the sensed bars 61 (e.g., detecting speed at an accuracy of 1% with a +/−5% speed variation from patch to patch in one embodiment).

In one implementation, data may be collected in parallel from the plural sensors 54 of sensor assembly 30. For example, the sampling of data may be simultaneously read or cycled from the individual sensors at a rate of 10 kHz and stored using flash memory of storage circuitry 44 in the described embodiment.

In exemplary operational monitoring embodiments, processing circuitry 42 may begin to read output of light detector (s) 62 at 0-1 ms after the start of a patch 63 and before the emission of light from emission sources 60 to provide information regarding the ambient light present during the monitoring. Processing circuitry 42 may control emission of light appropriate for the color of the respective patch 63 being presently monitored at 1 ms. After 2 ms, processing circuitry 42 may begin collecting the output of the sensors 54 and voltage of the respective light emission device every 0.1 ms until 1 ms before the end of the patch 63 (e.g., approximately 7.5 ms in one example). The above-described predefined patterns 58 of 400 mm in length and twenty color patches 63 (only fourteen are shown in FIG. 3) may be sensed in parallel in 150 msec at process speeds of 1.5-2.5 m/s (e.g., sampling rate of 0.1 ms per sensor 54 or approximately 1000 color patches 63 per second). Other monitoring and sampling embodiments are possible.

Exemplary calibration operations of different operations of imaging device 10 with respect to imaging are described below. The calibration operations are for illustration and other calibration operations are possible.

The movement information regarding speed and/or acceleration may be used in conjunction with information of the spatial location of predefined patterns 58 on the associated media to detect skew of media 52 along the paper path. For example, skew may be detected if one of the predefined patterns 58 is detected as moving faster than an other of the predefined patterns 58 or if the corresponding bars 61 of different predefined patterns 58 are detected at different moments in time. Responsive to the detection of skew, processing circuitry 42 may implement corrective measures, such as adjusting a pressure or speed of a media handling roller (not shown) of imaging device 10 to reduce or eliminate the detected skew. Also, processing circuitry 42 may implement scaling adjustment operations with respect to image monitoring and/or image generation to compensate for accelerations or decelerations detected with respect to movement of media 52 in the media path 20.

Drive currents of light emission sources 60 may also be calibrated in one embodiment. For example, it may be desirable for sensors 54 to provide enough light to yield sufficient LTV outputs of appropriate voltage in the solid areas of patches 63 (e.g., 50 mV) for appropriate signal-to-noise ratios and avoiding saturation in the paper (e.g., 4.5 V). In one embodiment, processing circuitry 42 may drive the light emission devices for illumination of appropriate color patches 63 using a starting current, such as 10 mA, while predefined patterns 58 are sensed. The starting current is used if an acceptable output voltage is provided by light detector 62 responsive to the emitted light. Alternatively, the drive currents may be incrementally increased until an acceptable output voltage is achieved for all gray levels including 100% whereupon the respective drive currents are selected.

Calibration operations may also be performed to compensate for light which may be reflected to the light detectors 62 prior to reflection by the hard color image 56 in one embodiment. The amount of reflected light may be considered to be linearly related to the output of sensors 54 (e.g., an output twice the intensity of another output may be considered to have twice the amount of reflected light). A relationship of drive current to output voltage (e.g., a 2 mV output from light detectors 62 may result from reflected light for every 10 mA emission source drive current) may be empirically derived and used to compensate for the output of the sensors 54 when the respective drive currents of the emission sources 60 are known. The determined output for internal reflections for the respective sensors 54 for the respective emitted light from emission sources 60 may be subtracted during sampling to reduce errors resulting from internal reflections in one embodiment.

As mentioned previously, output of sensors 54 may be indicative of optical density. Parameters for use in calculating optical density for a color may be determined in one embodiment by printing a hard color image (not shown) including two patches of the color at the opposite dot gain extremes of the capability of the image engine 14. The respective output from the sensors 54 using the patches may be plotted linearly to calculate the slope (parameter a of eqn. 1) and offset (parameter b of eqn. 1) for the respective color. The calibration may be performed for each color of marking agent and for each sensor 54 for use in subsequent optical density calculations with respect to output of the respective sensors 54.

Calibration operations may also be performed with respect to validation of output provided by sensors 54. For example, a known standardized reference color patch having a known optical density (e.g., according to a standard ANSI T value) may be sensed. Additionally, the image engine 14 may be controlled to print another color patch having coverage and optical density corresponding to the reference color patch. The outputs of the light detector 62 from the sensing of light reflected from the plural corresponding color patches may be compared to determine the accuracy (e.g., less than $1/100^{th}$).

According to additional aspects, calibration operations may be performed with respect to compensating for the presence of ambient light. For example, a hard color image having the predefined pattern 58 of FIG. 3 may be provided and the reflected light of the respective color patches 63 sensed. For each patch 63, one portion of the patch being sensed may be illuminated by an appropriate wavelength of light from emission source 60 while another portion of the patch may only be illuminated by ambient illumination (i.e., emission sources 60 are off). The outputs of the respective sensor 54 may be measured for each portion providing a difference indicative of the ambient illumination. Thereafter, the differences for the respective sensors 54 may be subtracted from the respective output of the sensors 54 to reduce errors resulting from the ambient light.

Additional calibration operations may be performed with respect to standardizing output of sensors 54. More specifically, in accordance with some embodiments, one or more look-up tables are accessed by processing circuitry 42 for converting signals from sensors 54 to standardized signals indicative of standardized optical density as described above. In some embodiments, the look-up table is provided. In other embodiments, one or more look-up tables are generated through one or more calibration measurements. To calibrate sensors 54 according to some embodiments, an area is printed with a color at a known density, and illuminated with a first illumination source chosen based on the printed color. In some embodiments, a plurality of calibration measurements are taken to generate a look-up table, while in some embodiments only one measurement is made. Values not explicitly in the look-up table may be interpolated from other values in the table according to some embodiments. In some embodiments, one look-up table is generated for each color to be measured. Accordingly, to convert received light to a standardized signal indicative of standardized optical density, an appropriate look-up table is selected based on the color of the area to be measured in some embodiments. The selected look-up table is used to associate the received light with a standardized signal indicative of standardized optical density.

Figure 5:
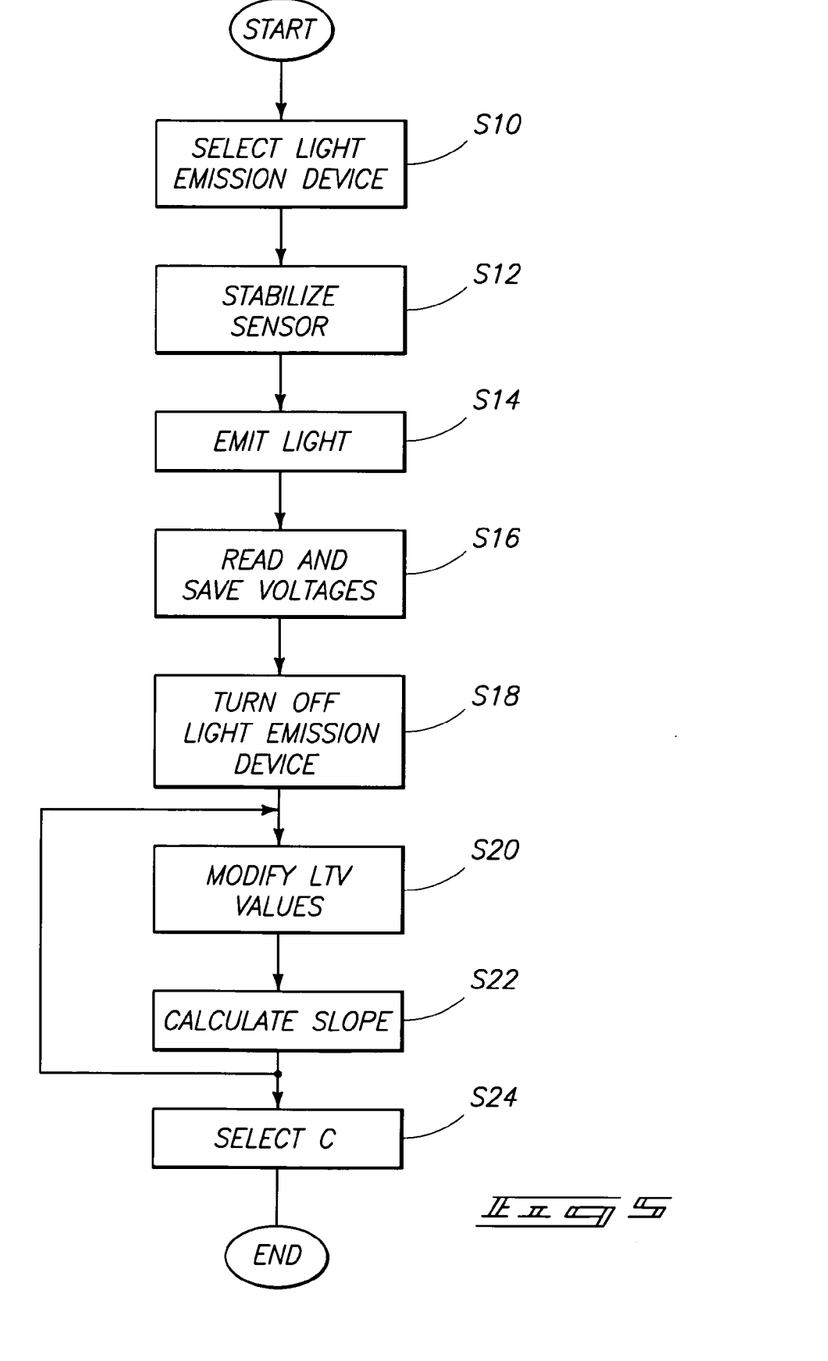
FIG. 5 is a flow chart of an exemplary method of calibrating heat compensation operations according to one embodiment.

In additional embodiments, calibration operations may be performed with respect to heat compensation. Referring to FIG. 5, an exemplary method of implementing heat compensation calibration operations of light sensor 54 are shown. According to one calibration procedure, the method of FIG. 5 is performed after the drive currents of the light emission devices have been calibrated. The depicted method may be performed by processing circuitry 42 in one embodiment. Light is emitted towards and received from the same portion of media during the execution of the method in one calibration embodiment. Other methods are possible including more, less and/or alternative steps.

Initially, at a step S10, one of the light emission devices of light sensor 54 is selected for heat compensation calibration.

At a step S12, the image sensor 54 is stabilized by controlling an other of the light emission devices different than the selected light emission device to emit light towards the media in one embodiment. The other light emission device emits light at substantially the same intensity as the light emitted from the selected one of the light emission devices during calibration in one embodiment.

After a sufficient passage of time during the emission of light using the other of the light emission devices (e.g., 1 ms), the other light emission device is turned off and the light emission source selected in step S10 is turned on to emit light at step S14.

At a step S16, voltages applied to the selected light emission device (e.g., Y_LED_V) and the output voltage of the light detector 62 (e.g., Y_LTV_V) are read for a selected period of time (e.g., 1000 ms) at a given frequency (e.g., 20 ms) and saved.

At step S18, after the passage of the selected period of time, the selected light emission device is turned off.

At steps S20-S24, the method proceeds to determine empirical factor C wherein the values of LTV are modified according to C and the voltages applied to the selected light emission device to provide Y_LTV_V_new and wherein Y_LED_V(0) is a baseline voltage. Initially at a step S20, C may be set to a minimal value such as 0. The value of C and the voltage applied to the light emission source may be used to calculate Y_LTV_V_new(j) according to:

$$Y\_LTV\_V\_new(j) = \frac{Y\_LTV\_V(j)}{Y\_LED\_V(0) - 1 - C \cdot \frac{Y\_LED\_V(j)}{Y\_LED\_V(j)}} \quad \text{Eqn. 3}$$

At a step S22, a slope for the given value of C is determined according to:

$$Slope = \frac{\sum_{j=0}^{49}(Y\_LTV\_V\_new(j) - \overline{Y\_LTV\_V\_new})(t(j) - \bar{t})}{\sum_{j=0}^{49}(t(j) - \bar{t})^2} \quad \text{Eqn. 4}$$

Following the determination of the slope for the given value of C, it is determined whether additional calculations may be performed or if an acceptable C for the empirical value for the selected light emission device has been determined. In one example, a value of C may be incremented by a selected increment and steps S20 and S22 may be performed again for the incremented values of C. An acceptable C may be determined if the slope is found to equal to zero in one aspect. In another aspect, steps S20 and S22 are repeated until a maximum C is reached and thereafter the C yielding the closest slope to zero may be selected as the empirical value C for the given light emission device.

At a step S24, the value for C yielding the closest slope to zero is selected in the described embodiment.

The method of FIG. 5 may be repeated to determine respective C values for the remaining light emission devices of light sensor 54.

Figure 6:
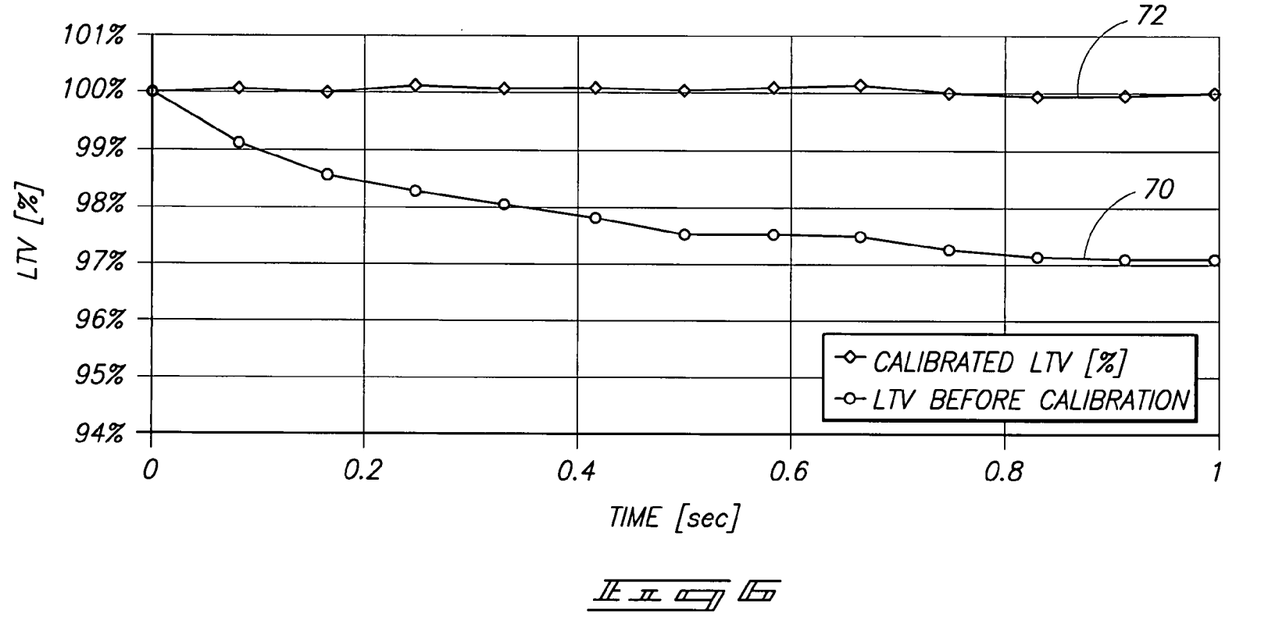
FIG. 6 is a graph illustrating results with and without heat compensation according to exemplary embodiments.

Referring to FIG. 6, an exemplary graph of LTV % versus time is shown for results before and after calibration. Line 70 illustrates a degrading sensed output of light sensor 54 prior to calibration discussed above and responsive to emission of light having a constant intensity using a selected one of the light emission devices. Line 72 represents the new output following calibration responsive to emission of light having a constant intensity using the selected light emission device.

Output of sensors 54 may be used to calibrate operations of imaging device 1 0 during imaging of images of a user job. For example, a hard color image having a desired predefined pattern may be provided or hard images of the actual job itself may be used. For example, a plurality of copies of the same image of a user job may be formed upon a single sheet of media (e.g., labels, business cards, postcards, etc.) and different copies may be sensed by different ones of the sensors 54 (e.g., corresponding to the locations of the copies on the sheet of media). Processing circuitry 42 may compare output of the appropriate sensors 54 which should be the same or similar in the described embodiment using copies of the same image, and adjust imaging operations if the results are outside of acceptable color consistency tolerances. For example, if different regions of a hard color image differ by an unacceptable amount, processing circuitry 42 may modify imaging operations such as modifying the image data and/or operations of image engine 14 in exemplary embodiments to improve color consistency.

More specifically, if one region has 18% coverage while another region has 20% coverage, the processing circuitry 42 may adjust the image data using a 2D lookup table to alter the color separation profile of the laser for generating latent images with respect to the region of the hard color image out of specification (e.g., modifying to adjust the laser power to provide 20% coverage instead of 18% coverage at the appropriate region of the hard color image). In another illustrative example, processing circuitry 42 may alter the image data itself of the respective location out of specification (e.g., turning on or off additional pixels of respective appropriate superpixels in embodiments utilizing superpixel imaging techniques). In exemplary embodiments, the 2D lookup tables may be calibrated using digital tools and/or physical tools such as Z modulation.

In another embodiment, processing circuitry 42 may use a 1D look up table to adjust a pressure applied by one or more of the blanket and/or impression imaging drums 28 to the respective regions of the hard color image (e.g., increase the pressure intermediate photoconductor 24 and the blanket imaging drum 28 coupled therewith to increase the dot gain coverage for a respective region of the hard color image below coverage specification). Other calibration operations may be implemented in other embodiments.

A hard color image having predefined patterns may be sensed a plurality of times by sensor assembly 30 in one embodiment to perform different ones of the respective calibration operations. Additionally, different hard color images having different color patterns may be used in different calibration embodiments. Further, some calibration operations may be performed less frequently than others. In addition, some of the calibration operations may be performed using hard color images having predefined patterns or hard color images of a user job in some of the described embodiments.

In one exemplary calibration methodology, a hard color image having known (e.g., standardized or measured) color patches may be provided to first determine the drive currents of the light emission devices of emission sources 60. Thereafter, using the known drive currents, above-described calibration operations with respect to reflectance, heat compensation, OD parameter determination and/or validation may be performed.

Figure 7:
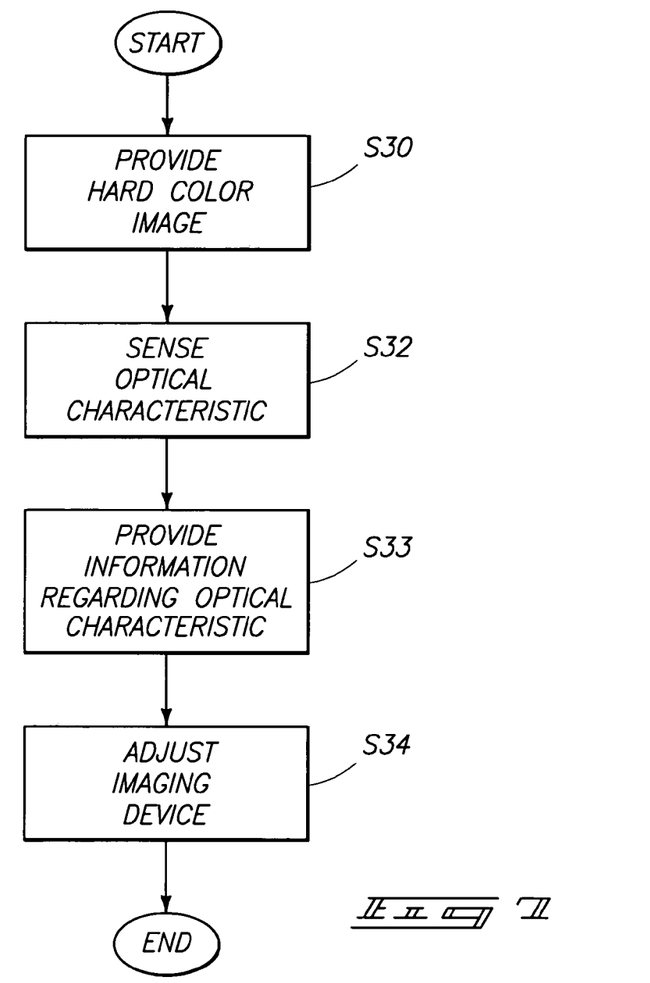
FIG. 7 is a flow chart of an exemplary method of monitoring hard color images and adjusting imaging operations according to one embodiment.

Referring to FIG. 7, an exemplary method which may be performed with respect to imaging device 10 is shown. The depicted flow chart illustrates exemplary operations with respect to monitoring of hard images and adjustment of the imaging device 10 responsive thereto. Other methods are possible for monitoring and/or adjusting imaging device 10.

At a step S30, a hard color image used to implement the process is provided. In one aspect, imaging device 10 may be configured to generate the hard color image which may comprise one or more predefined pattern, for example as shown in FIG. 3. As described above, the hard color image may be provided by another source in another embodiment.

At a step S32, an optical characteristic, such as optical density, of the hard color image is sensed. In one embodiment, the optical characteristic may be sensed at a plurality of locations of the hard color image. Additional exemplary details of step S32 are described with respect to the method of FIG. 8 in one embodiment.

At a step S33, information regarding the optical characteristic is provided responsive to the sensing of step S32.

At a step S34, information regarding the sensed optical characteristic may be used to adjust the imaging device 10. For example, in one embodiment, information regarding the optical characteristic may be used to implement calibration operations, adjust imaging operations and/or perform other desired actions with respect to imaging device 10 some of which are described above.

Figure 8:
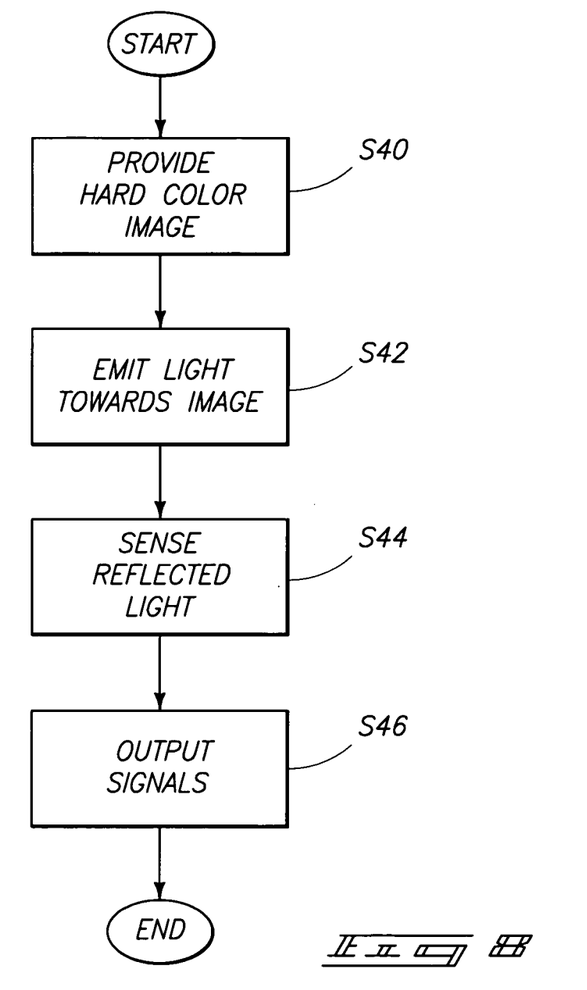
FIG. 8 is a flow chart of an exemplary method of additional details of monitoring hard color images according to one embodiment.

Referring to FIG. 8, an exemplary method of monitoring a hard image using imaging device 10 is shown according to one embodiment. Other methods are possible.

At a step S40, a hard color image used to implement the process is provided. Imaging device 10 may be configured to generate the hard color image (e.g., shown in FIG. 3 in one embodiment) or the hard color image may be provided by another source.

At a step S42, appropriate light (e.g., from sensor(s) 54) may be emitted and directed towards one or more region of the hard color image.

At a step S44, light reflected from the hard color image responsive to the emitted light may be sensed using sensor(s) 54.

At a step S46, the sensor 54 may output a plurality of signals indicative of the intensity of the light received by sensor 54. As mentioned above, the signals may be processed to provide information regarding the optical characteristic of one or more respective locations or regions of the hard color image in one embodiment.

At least some aspects of the disclosure provide apparatus and methods which enable image color spatial difference corrections, pressure calibrations, optical calibrations, etc. by utilizing sensor assemblies 30 having a plurality of sensors 54 positioned corresponding to different spatial regions or locations in the scan direction of the media being sensed. Furthermore, some embodiments provide configurations which may save time and media consumed by various calibrations of imaging device 10 and/or provide compensation for uniformity color variation in imaging device 10 at minimal increased cost or complexity. In addition, sensing devices and methods of some embodiments described herein enable accurate color analysis since the processing circuitry 42 knows which colors are being printed or otherwise sensed to compensate for imperfections in the spectrum of the emission sources 60. Sensor assemblies 30 described herein also have advantages over relatively expensive sensors which may produce excessive heat (e.g., densitometers using incandescent Tungsten lamps) causing reduced accuracy, susceptible to change over the lifetime of operation, and increased stabilization times before readings may be taken.

The protection sought is not to be limited to the disclosed embodiments, which are given by way of example only, but instead is to be limited only by the scope of the appended claims.

What is claimed is:

1. A method to improve color consistency across a media path, the method comprising:
   calibrating respective light-to-voltage values for a plurality of densitometers, each of the densitometers comprising a light detector, each of the densitometers further comprising a plurality of light emission sources for a plurality of different colors, the plurality of densitometers fixed at substantially equidistant positions across the media path, the calibration comprising:
      applying a known current to one of the plurality of light emission sources of a first one of the densitometers;
      measuring first voltages resulting from applying the known current to the light emission sources of the first densitometer;
      measuring second voltages output by the light detector of the first one of the densitometers; and
      determining a relationship between the first voltages and the second voltages as a function of time;
   measuring a plurality of optical densities corresponding to respective ones of a plurality of different spatial locations within a printed color image using the plurality of respective densitometers,
   compensating the measurements of the optical densities based on the calibrated light-to-voltage values; and
   calibrating at least one operation of an image formation engine based on the measured optical densities to adjust a first optical density of a printed color at a first location across the media path relative to a second optical density of the same printed color at a second location across the media path.

2. The method of claim 1, wherein measuring the optical densities comprises measuring the optical densities along a feed direction of the media path.

3. The method of claim 1, wherein measuring the optical densities comprises substantially simultaneously sensing the optical densities at the different spatial locations.

4. The method of claim 1, wherein measuring the optical densities comprises emitting light towards a first one of the spatial locations and measuring light reflected by the printed color image at the first one of the spatial locations.

5. The method of claim 4, wherein emitting the light comprises activating a first one of the light emission sources corresponding to the first one of the spatial locations.

6. The method of claim 5, further comprising:
activating the first one of the light sources using a drive current; and
selecting the drive current to provide a desired response of the light detector.

7. The method of claim 4, wherein measuring the light reflected comprises adjusting an output of the light detector to compensate for an effect of temperature on the light emission sources.

8. The method of claim 1, wherein calibrating the operation of the image formation engine comprises selecting a first color separation profile to be applied at the first location relative to a second separation profile to be applied at the second location.

9. The method of claim 1, wherein calibrating the operation of the image formation engine comprises adjusting a first pressure to be applied by an imaging drum at the first location relative to a second pressure to be applied by the imaging drum at the second location.

10. The method of claim 1, further comprising configuring a first one of the sensors light detectors to reduce an effect of ambient light.

11. The method of claim 1, further comprising adjusting a media feeder to reduce a skew of the printed color image along the media path.

12. The method of claim 1, further comprising forming, using the image formation engine, the printed color image upon media using image data corresponding to a color image to be reproduced, the printed color image corresponding to the color image.

13. The method of claim 12, wherein forming the printed color image comprises developing a latent image corresponding to the printed color image using a marking agent.

14. The method of claim 13, wherein the marking agent comprises a liquid ink.

15. The method of claim 12, wherein the printed color image comprises a plurality of patterns positioned at the different spatial locations within the color image.

16. An apparatus comprising:
an image engine to apply a marking agent upon media in a media path of the apparatus to form at least one printed color image on the media;
a plurality of densitometers positioned adjacent to the media path to provide signals regarding optical densities for the at least one color image, the signals corresponding to respective ones of a plurality of spatial locations within the at least one printed color image, each of the densitometers comprising a light detector, each of the densitometers further comprising a plurality of light emission sources for a respective plurality of different colors, the plurality of densitometers fixed at substantially equidistant positions across the media path; and
a processor in communication with the plurality of densitometers to:
calibrate at least one operation of the image engine based on the optical densities to adjust a first optical density of a printed color at a first location across the media path relative to a second optical density of the same printed color at a second location across the media path and the processor to calibrate respective light-to-voltage values for the plurality of densitometers by:
applying a known current to one of the plurality of light emission sources of a first one of the densitometers;
measuring first voltages resulting from applying the known current to the light emission sources of the first densitometer;
measuring second voltages output by the light detector of the first one of the densitometers; and
determining a relationship between the first voltages and the second voltages as a function of time.

17. The apparatus of claim 16, wherein the densitometers substantially simultaneously provide the signals.

18. The apparatus of claim 16, wherein the densitometers are to emit light and to receive light reflected from a respective one of the spatial locations.

19. The apparatus of claim 18, wherein a first one of the densitometers is to emit light of a first wavelength at the same time that a second one of the densitometers is to emit light of a second wavelength.

20. The apparatus of claim 19, wherein the processor is to select one of the different wavelengths of light for emission by a first one of the densitometers corresponding to a color present at a corresponding one of the different spatial locations.

21. The apparatus of claim 16, wherein the processor is to select a first color separation profile to be applied at the first location relative to a second color separation profile the second location.

22. The apparatus of claim 16, wherein the image engine comprises an imaging drum to transport the marking agent to the media, and the processor is to adjust a first pressure to be applied by the imaging drum at the first location relative to a second pressure to be applied by the imaging drum at the second location.

23. The apparatus of claim 16, wherein the marking agent comprises a liquid ink.

24. The apparatus of claim 16, further comprising a memory storing machine-readable instructions that, when executed, cause the processor to calibrate the at least one operation of the image engine based on the optical densities.

25. A tangible machine readable storage device or storage disc storing machine-readable instructions that, when executed, cause a machine to at least:
calibrate respective light-to-voltage values for a plurality of densitometers, each of the densitometers comprising a light detector, each of the densitometers further comprising a plurality of light emission sources for a plurality of different colors, the plurality of densitometers fixed at substantially equidistant positions across a media path, the instructions to cause the machine to calibrate the respective voltage values by:
applying a known current to one of the plurality of light emission sources of a first one of the densitometers;
measuring first voltages resulting from applying the known current to the light emission sources of the first densitometer;
measuring second voltages output by the light detector of the first one of the densitometers; and
determining a relationship between the first voltages and the second voltages as a function of time
measure a plurality of optical densities corresponding to respective ones of a plurality of different spatial locations within a printed color image using the plurality of respective densitometers;
compensate the measurements of the optical densities based on the calibrated light-to-voltage values; and
select, based on the measured optical densities, a first color separation profile to be applied by an image formation engine at a first location across the media path for a printed color relative to a second color separation profile to be applied by the image formation engine at a second location across the media path for the same printed color.

26. The storage device or storage disc of claim 25, wherein the machine-readable instructions, when executed, cause the machine to measure the optical densities across the media path.

27. The storage device or storage disc of claim 25, wherein the machine-readable instructions, when executed, cause the machine to measure the optical densities at substantially the same time.

28. The storage device or storage disc of claim 25, wherein the machine-readable instructions, when executed, cause the machine to measure a first one of the optical densities by emitting light toward a first one of the spatial locations and measuring light reflected by the printed color image.

29. The storage device or storage disc of claim 25, wherein the machine-readable instructions, when executed, cause the machine to adjust an output of the light detector to compensate for an effect of temperature on the light emission sources.

30. The storage device or storage disc of claim 25, wherein the machine-readable instructions, when executed, cause the machine to adjust, based on the measured optical densities, a first pressure to be applied by an imaging drum for the printed color at the first location relative to a second pressure to be applied by the imaging drum at the second location for the same printed color.

31. The storage device or storage disc of claim 25, wherein the machine-readable instructions, when executed, cause the machine to form the printed color image using a marking agent.

\* \* \* \* \*

UNITED STATES PATENT AND TRADEMARK OFFICE
CERTIFICATE OF CORRECTION

PATENT NO.        : 8,717,647 B2
APPLICATION NO.   : 11/250784
DATED             : May 6, 2014
INVENTOR(S)       : Omer Gila et al.

It is certified that error appears in the above-identified patent and that said Letters Patent is hereby corrected as shown below:

In the Claims

In column 14, line 46, in Claim 1, delete "densitometers," and insert -- densitometers; --, therefor.

In column 15, line 14, in Claim 8, delete "second" and insert -- second color --, therefor.

In column 15, line 22, in Claim 10, delete "sensors light" and insert -- light --, therefor.

In column 16, line 24, in Claim 21, delete "profile" and insert -- profile to be applied at --, therefor.

In column 16, line 57, in Claim 25, delete "time" and insert -- time; --, therefor.

Signed and Sealed this
Eleventh Day of November, 2014

Michelle K. Lee
*Deputy Director of the United States Patent and Trademark Office*